United States Patent [19]
Taketsugu et al.

[11] Patent Number: 5,740,167
[45] Date of Patent: Apr. 14, 1998

[54] DUAL MODE MULTIPLE ACCESS METHOD FOR COMMON RADIO CHANNEL

[75] Inventors: Masanori Taketsugu; Kazutomo Kobayashi, both of Tokyo, Japan

[73] Assignee: NEC Corporation, Tokyo, Japan

[21] Appl. No.: 628,139

[22] Filed: Apr. 4, 1996

[30] Foreign Application Priority Data

Apr. 4, 1995 [JP] Japan ................................ 7-078788

[51] Int. Cl.⁶ .................................................. H04J 3/16
[52] U.S. Cl. ............................ 370/337; 370/346; 370/348
[58] Field of Search ........................... 370/280, 294, 370/329, 461, 337, 349, 322, 422, 443, 447, 449, 445, 348, 346, 522; 371/5.1; 340/825.5, 825.06, 825.07, 825.08, 354

[56] References Cited

U.S. PATENT DOCUMENTS

| | | | |
|---|---|---|---|
| 4,612,637 | 9/1986 | Davis et al. | 370/445 |
| 4,930,118 | 5/1990 | Sugihara | 370/449 |
| 5,012,469 | 4/1991 | Sardana | 370/348 |
| 5,151,693 | 9/1992 | Onoe et al. | 340/825.3 |
| 5,412,659 | 5/1995 | Fujita et al. | 370/337 |
| 5,521,904 | 5/1996 | Eriksson et al. | 370/337 |

*Primary Examiner*—Chau Nguyen
*Attorney, Agent, or Firm*—Sughrue, Mion, Zinn, Macpeak & Seas, PLLC

[57] ABSTRACT

In a radio communications system wherein a common channel is accessed from multiple terminals, any of the terminals is allowed to transmit a packet through the common channel to a base station on a random access mode when the packet received at the base station has a low error rate, and a specified one of the terminals is allowed to transmit a packet on a controlled access mode when the packet received at the base station has a high error rate.

24 Claims, 10 Drawing Sheets

BASE-TRANSMITTED PACKET

MOBILE-TRANSMITTED PACKET

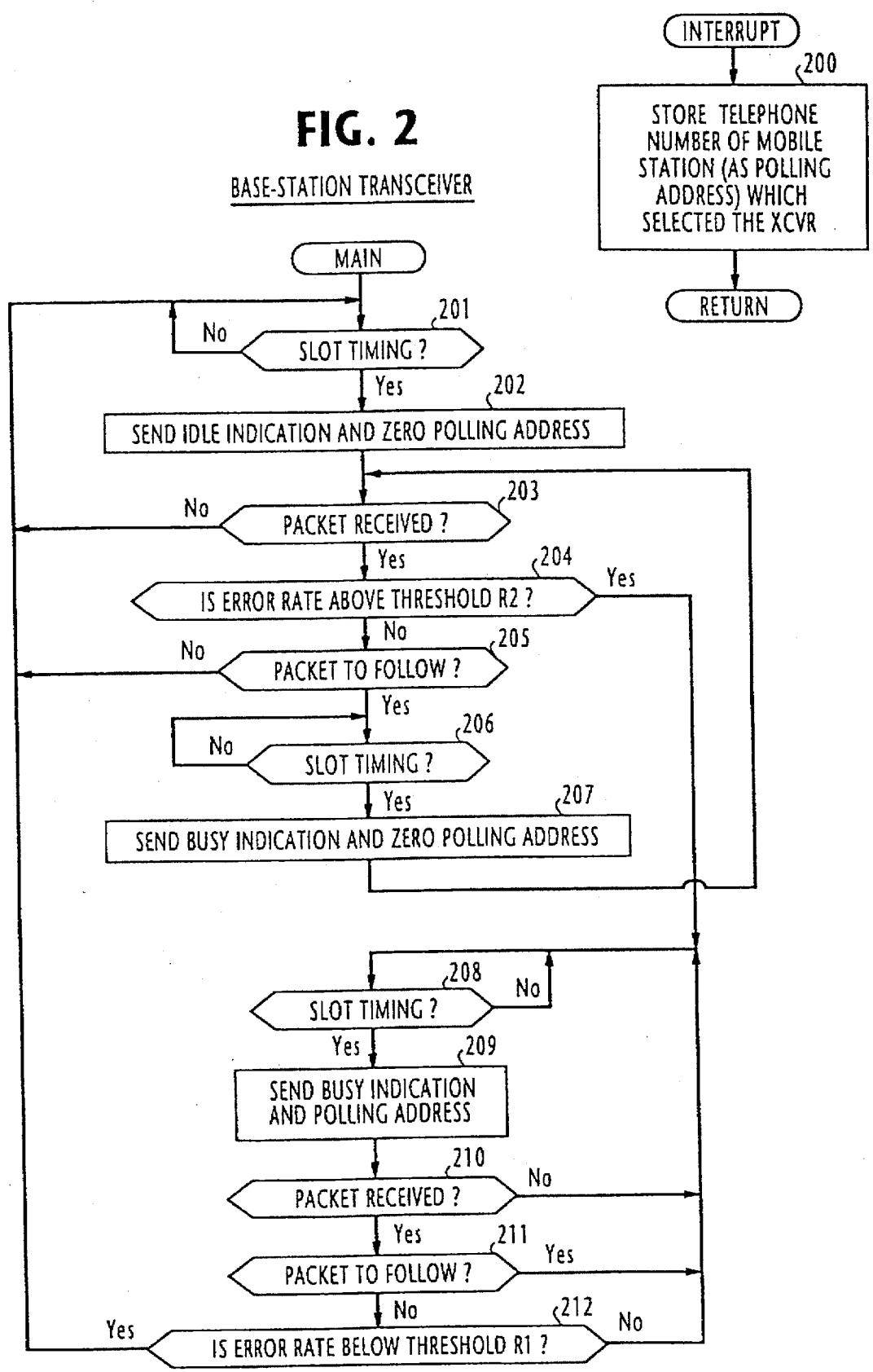

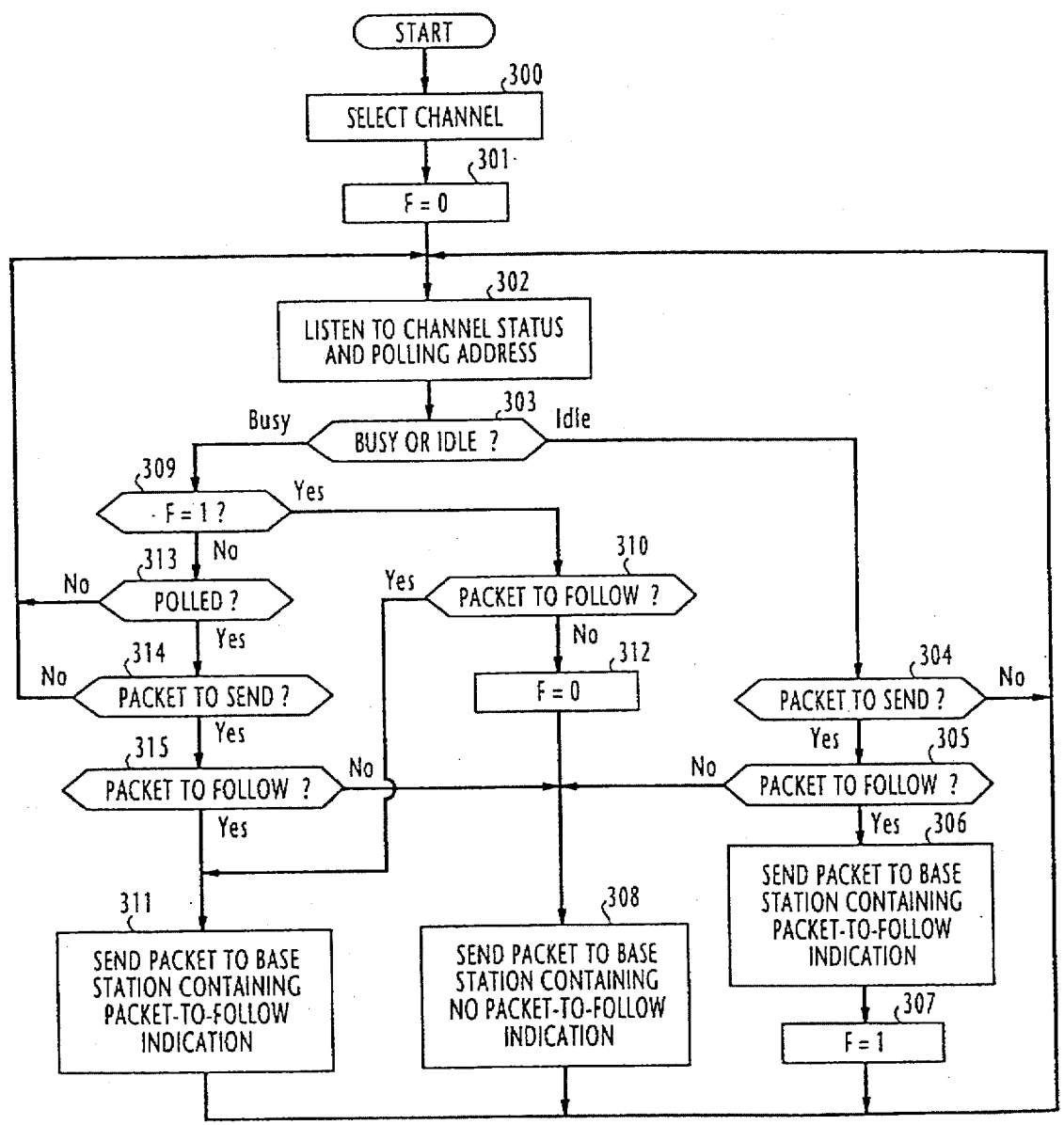

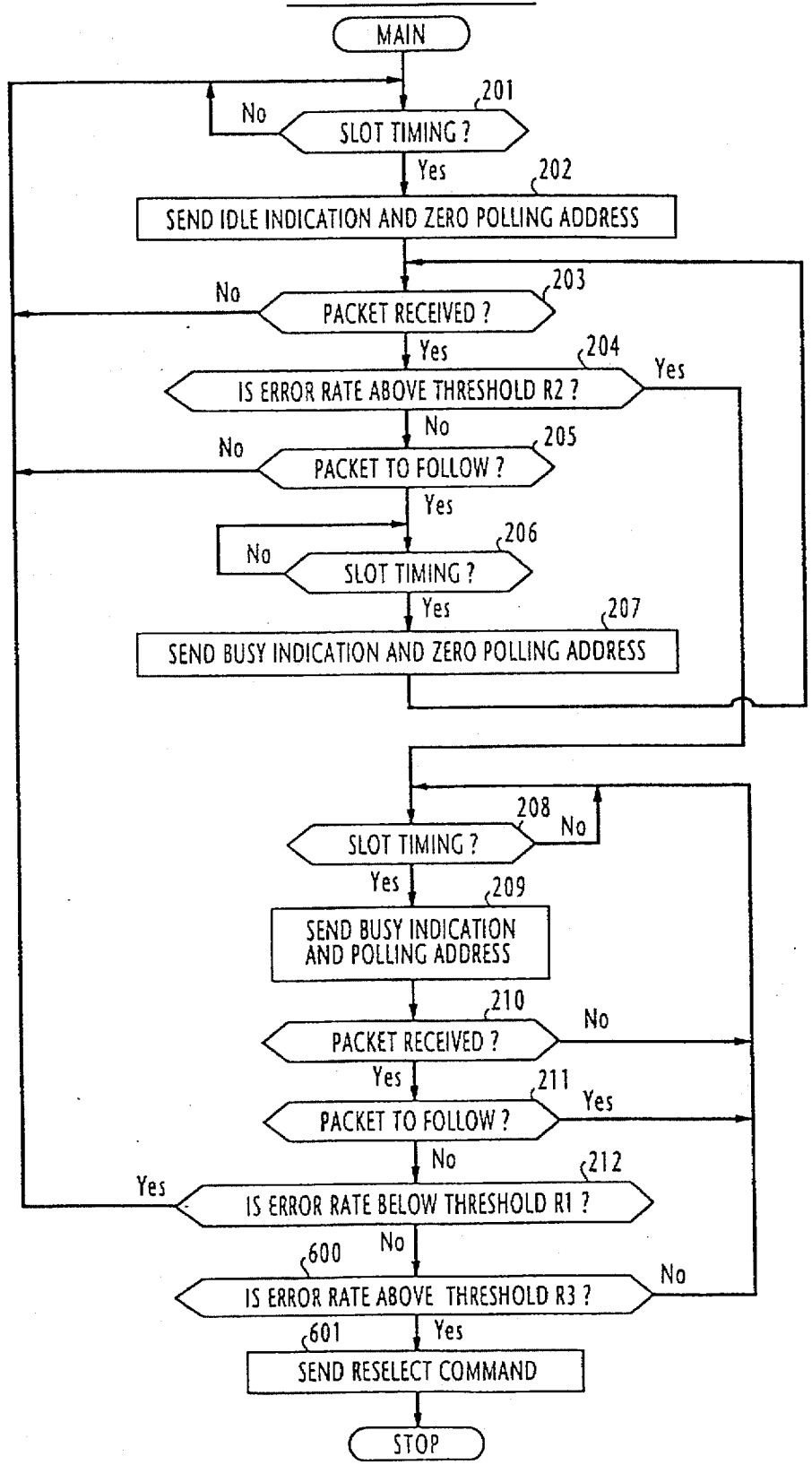

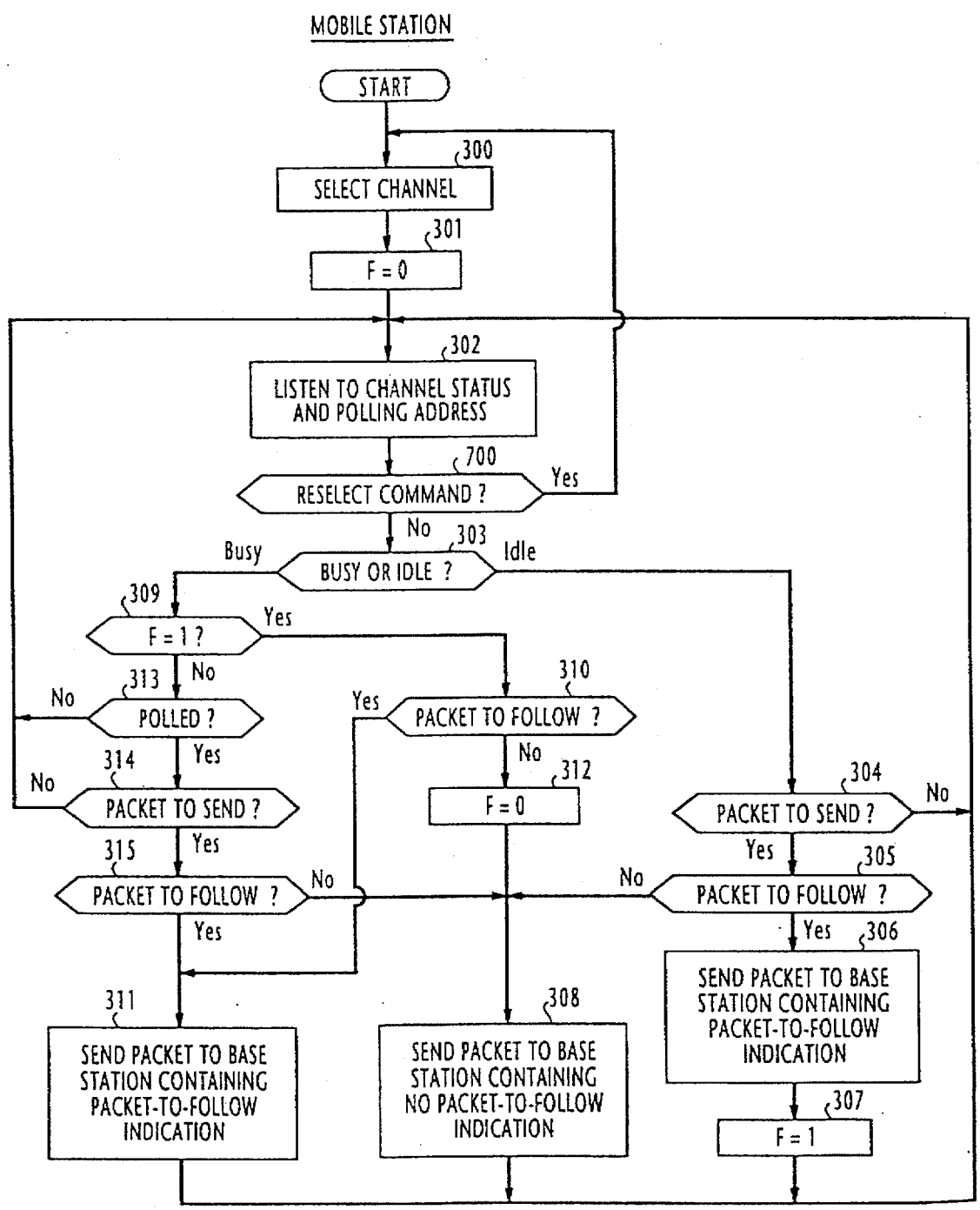

BASE-STATION TRANSCEIVER

DUAL MODE MULTIPLE ACCESS METHOD FOR COMMON RADIO CHANNEL

BACKGROUND OF THE INVENTION

1. Field of the Invention

The present invention relates generally to radio communications systems, and more specifically to a multiple access method for a common radio channel.

2. Description of the Related Art

Current techniques for accessing a common channel medium from a plurality of terminals include the carrier sense multiple access/collision detection (CSMA/CD) scheme if the channel medium is a bus system of a computer or a wire-line network. However, be carrier sensing technique is not suitable for radio communications system since all of the terminals are not necessarily capable of sensing the carrier due to the difficulty to ensure line-of-sight propagation at all times. To mitigate this shortcoming, a random multiple access technique known as an ICMA (Idle-signal Casting Multiple Access) has been proposed wherein an idle/busy indication is transmitted from a central site to terminals, which randomly seek the right to use the common medium when an idle flag is given. However, because of the shadowing effect of a stronger signal being captured in preference to a weak signal, the contention loser has no way of knowing that he has lost in a contention and continues transmission as another contention winner, giving rise to a high data error rate. To reduce the shadowing effect, an improved version of the ICMA has been proposed. This technique is known as ICMA-PE (Idle-signal Casting Multiple Access with Partial Echo) since the source address of a transmitting terminal is copied at the central site and a packet is broadcast containing the copied address so that only this terminal is allowed to continue transmission. While this random access technique is satisfactory for a system if the number of terminals is small, the likelihood of collisions increases during high traffic periods.

Another well known technique is the polling access scheme in which the right of use is shifted from one terminal to the next by transmitting polling signals to successive terminals. While this polling technique has no data collision, the inherent delay will become intolerable if the system is required to serve a great number of terminals.

SUMMARY OF THE INVENTION

It is therefore an object of the present invention to overcome the prior art shortcomings by combining the benefits of a random access scheme and a polling access scheme.

According to a broader aspect of the present invention, there is provided a method for accessing a common channel from a plurality of terminals, comprising the steps of allowing any of the terminals to transmit a packet through the common channel to a base station on a random access mode when the packet received at the base station has a low error rate, and sequentially allowing a specified one of the terminals to transmit the packer on a controlled access mode when the packet received at the base station has a high error rate.

According to a first specific aspect, the present invention provides a method for accessing a common channel from a plurality of terminals, comprising the steps of:

a) transmitting a forward packet from a base station through the common channel to the terminals;

b) receiving the forward packet at the terminals;

c) transmitting a reverse packet from any of the terminals to the base station through the common channel if the received forward packet contains an idle indication, or from one of the terminals which previously transmitted a packet if the received forward packet contains a busy indication, or from a specified one of said terminals if the received forward packet contains a polling address;

d) if no packet is received at the base station, repeating the step (a) to transmit a forward packet which contains the idle indication;

e) if the reverse packet is received at the base station, determining whether the received packet has a high or low error rate;

f) if the received reverse packet is determined as having a low error rate, repeating the step (a) to transmit a packet which contains the idle indication if the received reverse packet contains an indication that there is no packet to follow, or transmit a packet which contains the busy indication if the received reverse packet has art indication that there is a packet to follow; and g) if the received reverse packet is determined as having a high error rate, sequentially repeating the step (a) to transmit packets which contain polling addresses successively identifying the terminals.

According to a second specific aspect, the present invention provides a method for accessing a common channel from a plurality of terminals, comprising the steps of:

a) transmitting a forward packet from a base station through the common channel to the terminals;

b) receiving the forward packet at the terminals;

c) if the received forward packet contains an idle indication, transmitting a reverse packet from any of the terminals to the base station through the common channel, and if the received forward packet contains a polling address, transmitting a reverse packet from a specified one of the terminals;

d) if no packet is received at the base station, repeating the step (a) to transmit a forward packet which contains the idle indication;

e) if the reverse packet is received at the base station, determining whether the received packet has a high or low error rate;

f) if the received reverse packet is determined as having a low error rate, repeating the step (a) to transmit a packet which contains the idle indication if the received reverse packet contains an indication that there is no packet to follow, or transmit a packet which contains a polling address identifying one of the terminals which transmitted a previous reverse packet containing an indication that there is a packet to follow; and g) if the received reverse packet is determined as having a high error rate, sequentially repeating the step (a) to trait packets which contain polling addresses successively identifying the terminals.

According to a third specific aspect, the present invention provides a method for accessing a common channel from a plurality of terminals, comprising the steps of:

a) transmitting a forward packet from a base station through fie common channel to the terminals;

b) receiving the forward packet at the terminals;

c) if the received forward packet contains an idle indication, transmitting a reverse packet from any of the terminals to the base station through the common channel, and if the received forward packet contains a busy indication and a polling address, transmitting a reverse packet from one of the terminals identified by the polling address, and if the received forward packet contains the busy indication and a zero polling address, storing copies of previous packets which were simultaneously transmitted from ones of the terminals for later retransmission when the ones of the terminals are successively identified by polling addresses;

d) if no packet is received at the base station, repeating the step (a) to transmit a forward packet which contains the idle indication;

e) if the reverse packet is received at the base station, determining whether the received packet has a high or low error rate;

f) if the received reverse packet is determined as having a low error rate, repeating the step (a) to transmit a packet which contains the idle indication if the received reverse packet contains an indication that there is no packet to follow, or transmit a packet which contains the busy indication and a polling address identifying one of the terminals which transmitted a previous reverse packet containing an indication that there is a packet to follow; and g) if the received reverse packet is determined as having a high error rate, repeating the step (a) to transmit a packet containing the busy indication and the zero polling address and then sequentially repeating the step (a) to transmit packets containing polling addresses successively identifying the terminals.

BRIEF DESCRIPTION OF THE DRAWINGS

The present invention will be described in further detail with reference to the accompanying drawings, in which:

FIG. 2 is a flowchart illustrating a sequence of programmed steps of a main routine performed by a base station transceiver, FIG. 2a illustrating an interrupt routine of the transceiver;

FIG. 3 is a flowchart illustrating a sequence of programmed steps performed by a mobile station in cooperation with the operation of the transceiver of FIG. 2;

FIG. 6 is a flowchart of the base station transceiver according to a modified form of the embodiment of FIG. 2;

FIG. 7 is a flowchart of the mobile station according to a modified form of the embodiment of FIG. 3;

DETAILED DESCRIPTION

Figure 1:
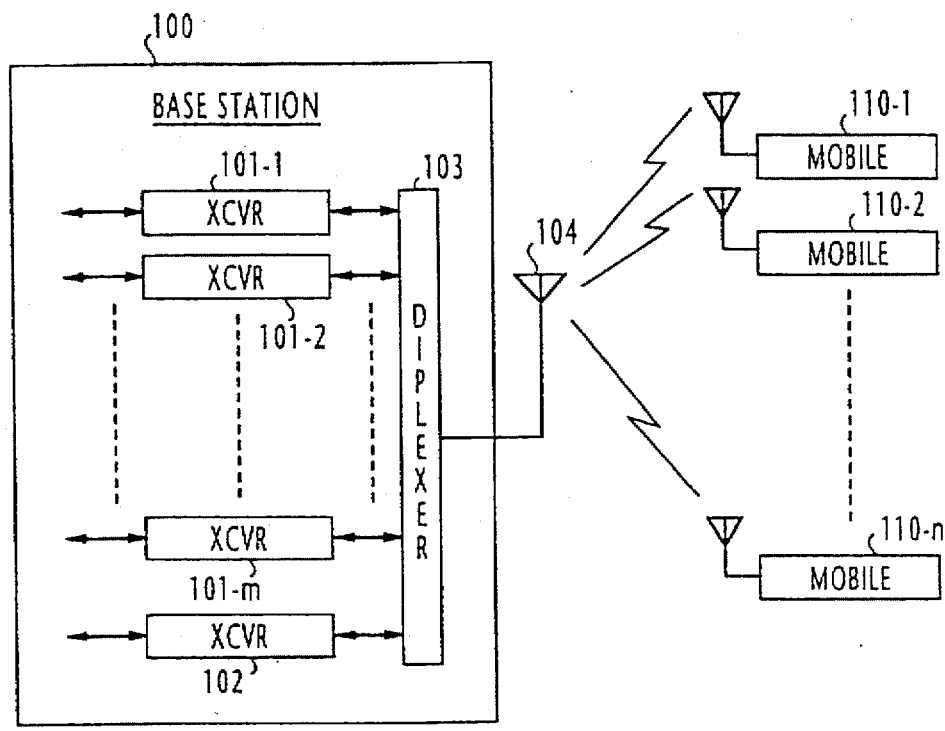
FIG. 1 is a block diagram of a radio communications system embodying the present invention, with FIGS. 1a and 1b illustrating respectively the structures of base- and mobile-transmitted packets.

Referring now to FIG. 1, there is shown a mobile communications system in which the multiple access method of the present invention is incorporated. As one example, the system is described as a TDMA-TDD (time division multiple access-time division duplex) cellular communication system. A representative cell-site base station 100 and a plurality of mobile stations 110-1 through 110-n are illustrated. Base station 100 has a plurality of data transceivers 101-1 through 101-m and at least one control transceiver 102. All transceivers are connected to antenna 104 via a diplexer 103. Each data transceiver 101 establishes a forward channel (base to mobile) and a reverse channel (mobile to base) for carrying data signals, and the control transceiver 102 allows each mobile station to select one of the data transceivers. Note that the selection of a data transceiver by a mobile station is analogous to the selection of a channel. Additionally, each data transceiver (channel) is used on a shared basis by a plurality of "k" mobile stations, where k is much smaller than the integer "n".

Figure 1A:

Because of the time division duplex (TDD) mode, each data transceiver and the associated mobile stations exchange packets in alternate intervals. As illustrated in FIG. 1a, the base-transmitted packet contains a busy/idle field 105, a polling address field 106 and a data field 107. The busy/idle field 105 of a packet transmitted from a data transceiver indicates whether the forward channel of this transceiver is busy or idle. The polling address field 106 of the packet carries the telephone number of each one of the mobile stations which share this transceiver in common. For this purpose, each data transceiver has a polling address memory, not shown, for storing the telephone numbers of such mobile stations. The data field 107 carries a base-to-mobile signal.

Figure 1B:
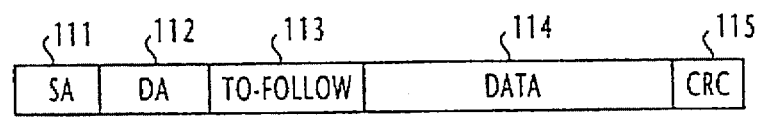

As illustrated in FIG. 1b, each mobile station 110 transmits a packet containing at least a source address field 111, a destination address field 112, a "to-follow" field 113 which indicates whether there is a packet to follow. The to-follow field 113 is followed by a data field 114 containing a mobile-to-base signal and a cyclic redundancy check (CRC) code field 115.

As will be described, each mobile station, after selecting a channel, periodically listens to the busy/idle field 105 of a packet received from the selected data transceiver to determine whether or not it can send a packet on the selected reverse channel. Each data transceiver and the mobile stations which share this transceiver operate initially in a random access mode and when the data error rate exceeds a predetermined threshold they shift to a polling access mode.

The operation of each data transceiver 101 is illustrated in the flowchart of FIG. 2 as a main routine of programmed steps. This main routine is interrupted by an interrupt routine 200 whenever the transceiver is selected by a new mobile station and its telephone number contained in the source address field 111 is stored into the polling address memory. The stored telephone number will be later used as a polling address.

The main routine status with step 201 that check to see if the transceiver is in a time slot to send its packet. If so, flow proceeds to step 202 to transmit a packet containing an idle indication (flag) in the busy/idle field and all zero bits in the polling address field. The Transceiver is then switched to a receive mode to determine whether a packet is received from a mobile station (step 203). If no packet is received, flow returns to seep 201 to transmit a packet in the next time slot. If a packet is received, flow proceeds from step 203 to decision step 204 to determine whether the error rate of the received signal is higher than a predetermined threshold R2 (see FIG. 4) by using the CRC code contained in the received packet. If the decision is negative, flow proceeds from step 204 to step 205 to check to see if the received packet contains a packet-to-follow indication. If not, flow returns to step 201. Otherwise, flow proceeds to step 206 to check for the next slot timing. At subsequent step 207, the transceiver sends a packet containing a busy indication (flag) in the busy/idle field and all zero bits in the polling address field. Following the transmission of this packet, flow returns to step 203 to repeat the process. If this process is continued, the system is operating in the random access mode since the mobile stations to which the same channel is commonly assigned provide transmission at random.

The system enters the polling access mode when the decision at step 204 reveals that the data error rate exceeds threshold R2. When this occurs, flow proceeds from step 204 to slot timing decision step 208. At subsequent step 209, the transceiver reads a successive one of the telephone numbers from the polling address memory as a polling address and sends a packet containing a busy indication in the busy/idle field and the read polling address in the polling address field. The mobile station having the same telephone number as the polling address contained in a received packet has the right to transmit a packet. Following the packet transmission, flow proceeds to step 210 to determine whether a packet is received from the polled station. If no packet is received from the polled station, flow returns to step 208 for polling the next station. If a packet is received from the polled station, flow proceeds from step 210 to step 211 to examine the "to-follow" field of this packet. If this field indicates that there is a packer to follow, flow returns to step 208 for polling the same mobile station again. If there is no packet to follow, flow proceeds from step 211 to step 212 to determine whether the error rate of the received signal falls below threshold R1 (see FIG. 4). Flow returns to step 208 when the decision at seep 212 indicates that the error rate is still higher than threshold R1 or returns to step 201 if the error rate falls below the threshold R1, terminating the polling access mode and entering the random access mode again.

In FIG. 3, the operation of each mobile station is illustrated. After channel selection with the control transceiver 102 (step 300), each mobile station initialize a flag F to 0 (step 301) and listens to the busy/idle and polling address fields of a packet transmitted on the selected channel at step 302. If the busy/idle field of the packet indicates that the channel is idle, flow proceeds from step 303 to step 304 to check to see if there is a packet to transmit. If there is none, flow returns to step 302. If there is a packet to send, flow proceeds from step 304 to step 305 to determine if there is a packet that follows. If so, flow proceeds from step 305 to step 306 to send a packet to the base station containing a packet-to-follow indication in the "to-follow" field of the packet. Exit then is to step 307 to set the flag F to 1, and flow returns to step 302. If there is no packet to follow, flow proceeds from step 305 to step 308 to send a packet to the base station containing no packet-to-follow indication in the "to-follow" field of the packet, and flow returns to step 302.

If a given mobile station has transmitted a packet during the previous time slot, the decision at step 303 indicates that the busy/idle field of the base-transmitted packet in the next slot is set to busy, and flow proceeds to step 309 to check to see if the flag F is set to 1. If the previous packet was sent from fiat given station, flag F is set to 1 and flow proceeds from step 309 to step 310 to determine whether there is a packet to follow. If so, flow proceeds from step 310 to step 311 to send a packet to the base station containing a packet-to-follow indication, and flow returns to step 302. If the decision at seep 310 indicates that there is no following packet, flow proceeds to step 312 to reset the flag F to 0, and flow proceeds to step 308 to send a packet containing no packet-to-follow indication.

If the previous packet was sent by another mobile station, flag F is 0 and the decision at step 309 is negative and flow proceeds to step 313 to examine the polling address field of the packet. If the busy/idle field of a packet is set to busy and the polling address field of the packet contains a polling address rather than all zero bits, the packet indicates that the system terminates a random access mode and enters a polling access mode. If the polling address does not match the telephone number of the mobile station, the decision at step 313 is negative and flow returns to step 302 to receive the next packet. If the polling address matches the telephone number of the mobile station, the decision at step 313 is affirmative and the mobile station recognizes that it is being polled by the base station and proceeds to step 314 to determine whether there is a packet to transmit. If there is none, flow returns to step 302, and if there is one, flow proceeds to step 315 to check to see if the packet is followed by a subsequent packet. If no packet follows, flow goes to step 308 to send a packet with no packet-to-follow indication. If there is a subsequent packet, flow proceeds to step 311 to send a packet with a packet-to-follow indication.

Figure 4:
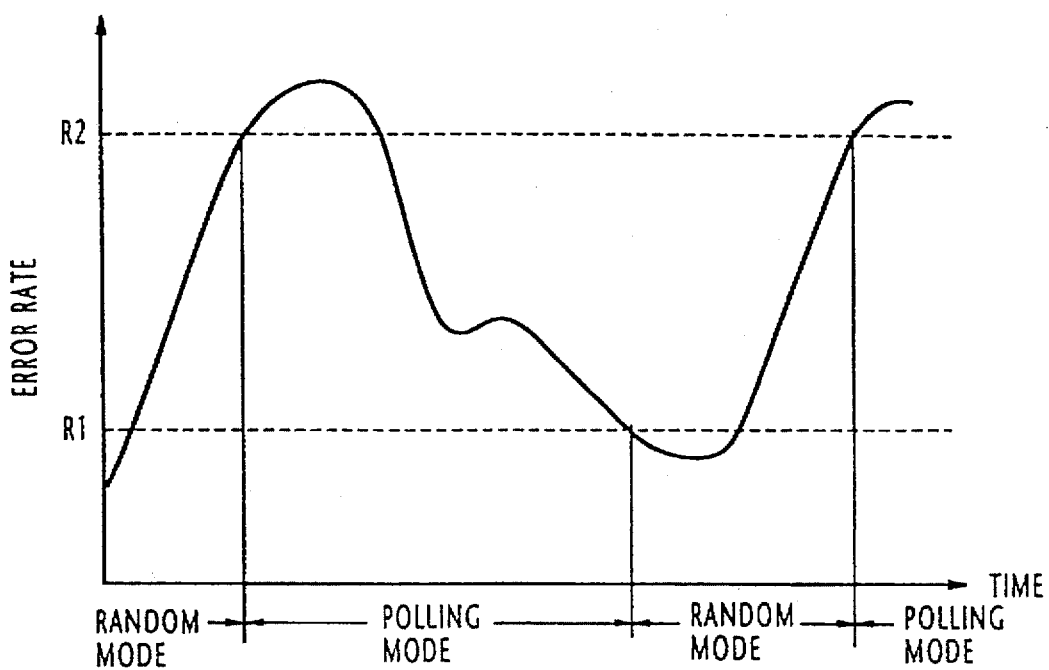
FIG. 4 is a graphic representation of data error race plotted as a function of time, illustrating decision thresholds used in the embodiment of FIGS. 2 and 3.
Figure 5:
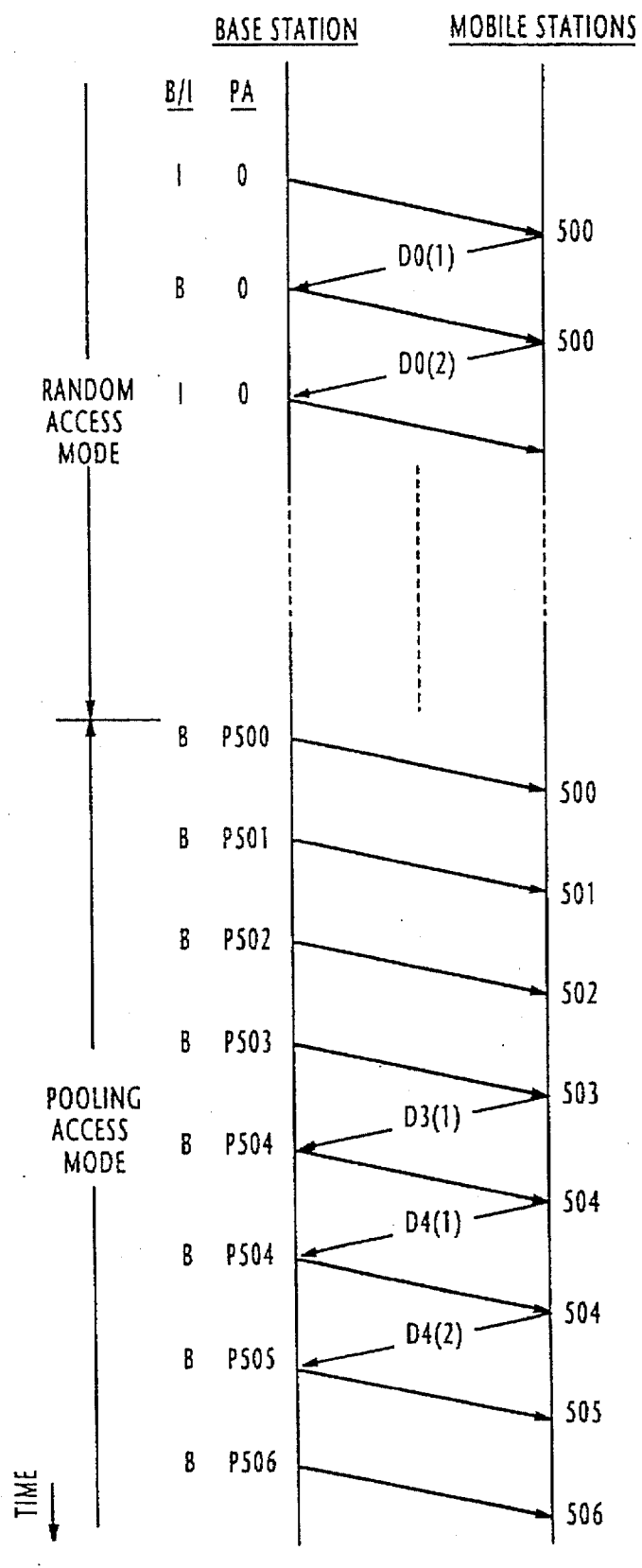
FIG. 5 is a timing chart illustrating a sequence of base- and mobile-transmitted packers during random and polling access modes associated with the embodiment of FIGS. 2 and 3.

The operation of the system will be fully understood by the following description with the aid of FIGS. 4 and 5. Initially, the operation starts with a random access mode. The data error rate determined at step 204 in the base-station transceiver will increase with time and becomes higher than the upper threshold R2 as the number of random transmissions exceeds some value.

FIG. 5 shows that, during the initial random access mode, mobile station 500 transmits two packets D0(1) and D0(2). The first packet is sent in response to a base-transmitted packet chat contains busy/idle field (B/I)=idle (I) and polling address field (PA)=all zero's (0) since the "to-follow" field of the first packet is set. On receipt of D0(1), the base-station transceiver sets the channel status to busy and returns a packet containing B/I=B and PA=0. In response, mobile station 500 transmits the second packet D0(2). Since the second packet is not followed by a subsequent packet, the transceiver resets the channel status to idle and returns a packet containing B/I=I and PA=0.

During the random access mode, the volume of traffic tends to increase with time due to retransmissions. When the error rate of a packet received by the base station exceeds the upper threshold R2, the base transmitter switches to the polling access mode by setting a busy indication in the B/I field of a packet and the telephone number of mobile station 500 in the polling address field as a polling address P500 and transmitting this packet. This packet is detected by mobile station 500. FIG. 5 shows that no packet exists in this station and similar polling events proceed to successively interrogate mobile stations 501 and 502. It is seen that mobile station 503 has only one packet to transmit and mobile station 504 has two packets. When mobile station 503 is polled by a packet containing B/I=B and PA=P503, it transmits a packet D3(1). Since this packet contains no packet-to-follow indication, the base-station transceiver advances its polling sequence to the next and returns a packet containing B/I=B and PA=P504. In response, mobile station 504 transmits a first packet D4(1). Base transceiver knows that this packet is to be followed, it holds its polling sequence and repeats the same polling action on mobile station 504, allowing it to send the second packet D4(2). During this polling access mode, transmissions from mobile stations are controlled and the error rate will decrease with time and eventually fall below the lower threshold R1 as illustrated in FIG. 4. Then the base transmitter switches back to the random access mode (step 211).

Figure 8:
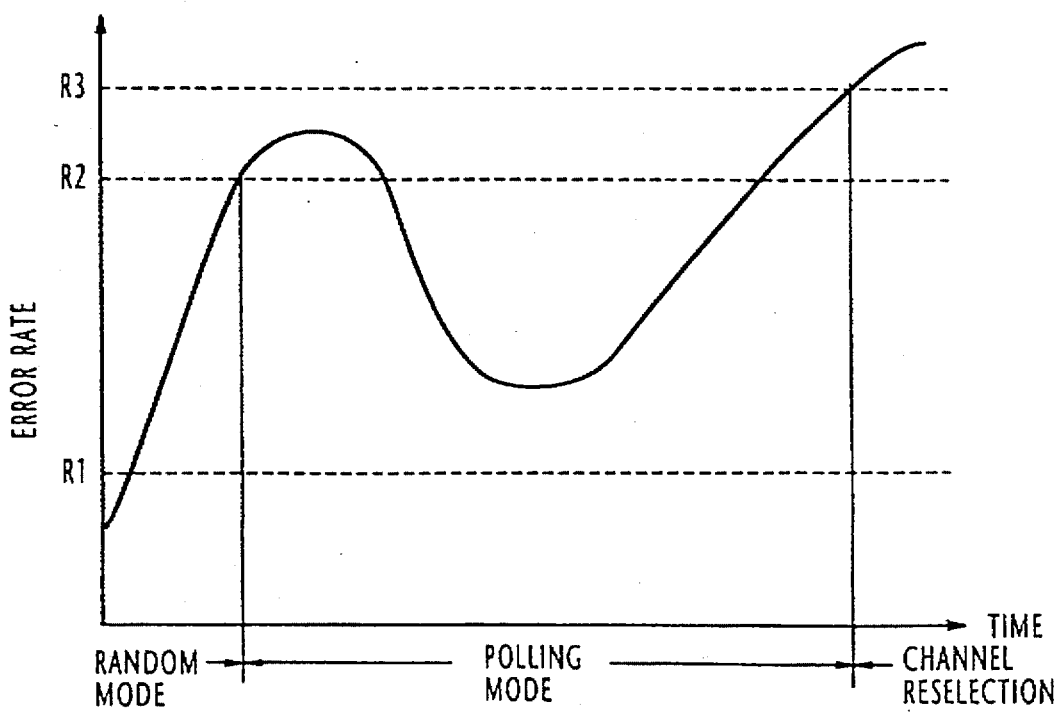
FIG. 8 is a graphic representation of data error rate plotted as a function of time, illustrating decision thresholds used in the embodiment of FIGS. 6 and 7.

Modified forms of the base station and mobile stations are shown in FIGS. 6 and 7, respectively. In FIG. 6, the operation of the base station differs from the flowchart of FIG. 2 in that it additionally includes steps 600 and 601. When the error rate is determined at step 211 as being higher than the lower threshold R1, flow proceeds to seep 600 to determine whether the error rate is higher than a third threshold R3 which is higher than the upper threshold R2 as illustrated in FIG. 8. If the decision at step 600 is negative, flow returns to step 207. Otherwise, the base transceiver determines that the selected channel is deteriorating and flow proceeds to step 601 to transmit a reselect command to the mobile stations and terminates the main routine.

In FIG. 7, the operation of the mobile station differs from the flowchart of FIG. 3 in that it additionally includes step 700 between steps 302 and 303. After execution of step 302, flow proceeds to step 700 where the mobile station determines whether the base-transmitted packet contains a reselect command. If so, flow returns to step 300 to reselect a new channel and the mobile station abandons the current channel. Otherwise, flow proceed to step 303.

Figure 9:
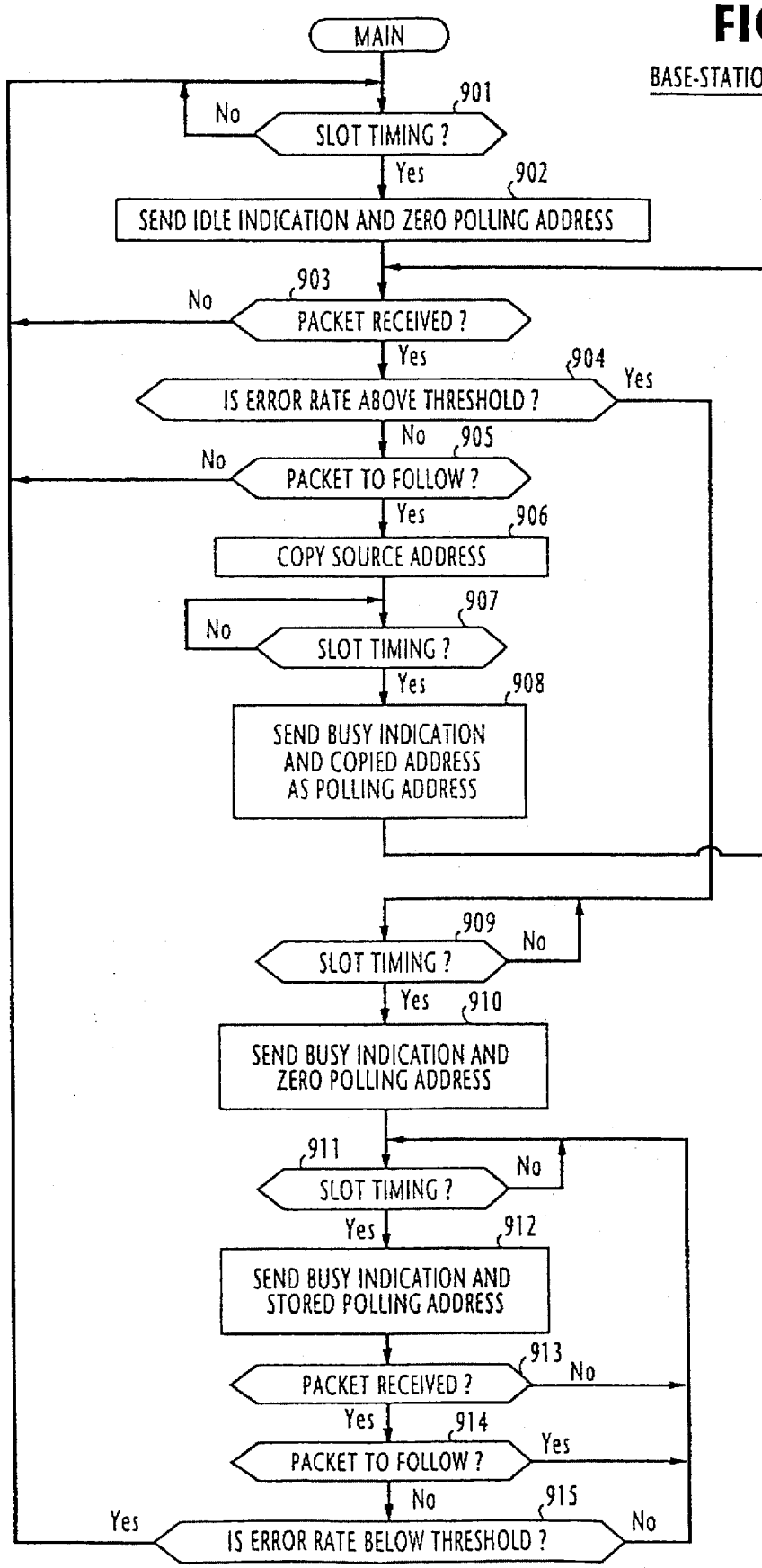
FIG. 9 is a flowchart of the base station transceiver according to a second modification of the embodiment of FIG. 2.
Figure 10:
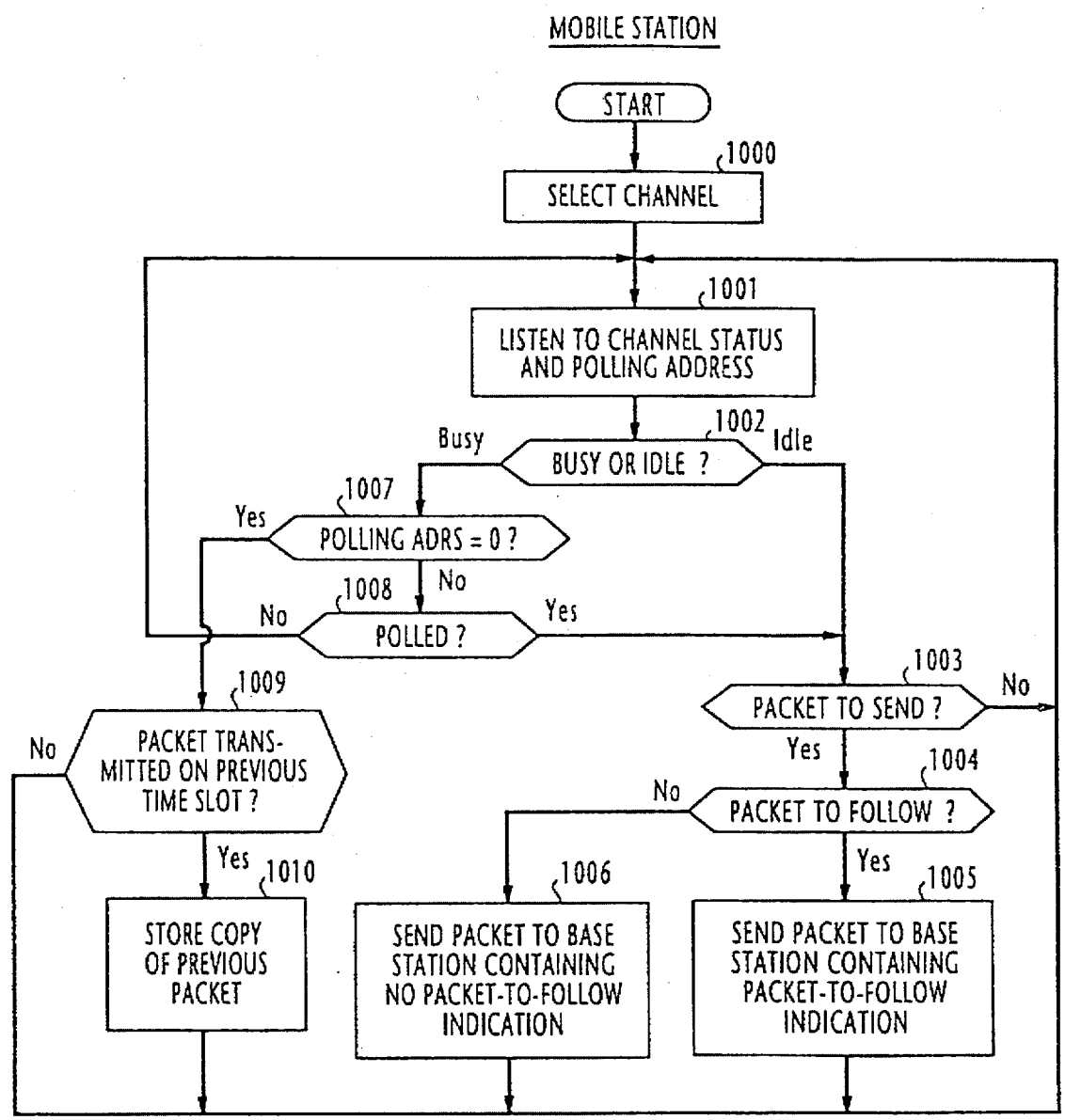
FIG. 10 is a flowchart of the mobile station according to a second modification of the embodiment of FIG. 3.

The base and mobile stations are further modified respectively as shown in FIGS. 9 and 10. According to this modification, the random access mode employs a partial polling technique as a means for preventing retransmissions from a contention loser which does not recognize that he has lost a contention due to the shadowing effect of the captured stronger signal of the contention winner. Additionally, a single error rate decision threshold is used to switch between random and polling modes.

In FIG. 9, the base-station transceiver transmits an idle indication with zero polling address at step 902 following the detection of a transmit time slot (step 901). If a packet is received from a mobile station (step 903), the error rate of the packet is determined using its CRC code by comparison with the derision threshold. If the error rate is lower than the threshold (step 904), flow proceeds to step 905 to check to see if the received packet has an indication that there is a subsequent packet. If the decision at step 905 is affirmative, flow proceeds to step 906 to copy of the source address of the packet. In the next transmit time slot (step 907), the transceiver sen&; a packet containing a busy indication in the B/I field and the copied source address in the polling address field (step 908). Therefore, the base-transmitted packet will be received by mobile stations as if it were a partial echo of a previous mobile-transmitted packet. The mobile stations, on receiving the packet, will recognize that only one of the mobile stations identified by the polling address field is entitled to send a subsequent packet. Following the packet transmission at step 908, flow returns to step 903 to repeat the process until the entitled mobile station discontinues transmissions.

When it is determined at step 905 that there is no subsequent packet to follow, flow returns to step 901 to send a packet in the next slot containing an idle indication and zero polling address.

If a packet collision occurs, the data error rate will exceed the decision threshold (step 904) and flow proceeds to time-slot detection step 909 for switching the system from random to polling mode. At subsequent step 910, the transceiver sends a packet containing a busy indication and a zero pollen address. The combination of these busy and polling indications is a preferable feature of this embodiment in that it allows the mobile stations that caused the data collision to store a copy of their packets for retransmission when they are subsequently polled.

In the next time slot (step 911), the transceiver reads a successive one of stored telephone numbers from the polling address memory (as mentioned earlier with reference to FIG. 2a) and sends a busy indication and the read telephone number as a polling address (step 912). If a reverse packet is subsequently received from a mobile station (step 913) and it is determined that there is a packet to follow (step 914), flow returns to step 911 to repeat the process by sending the same polling address. If it is determined that there is no packet received (step 913) or there is no packet to follow (step 914), flow proceeds to 915 to determine whether the error rate of the packet is lower than the decision threshold. If not, flow returns to step 911 to continue the polling access mode. If the error rate is lower than the threshold, it is determined that the system should be switched back to the random access mode and flow returns to step 901.

In FIG. 10, the mobile station, following a channel selection procedure (step 1000), listens to the channel status (busy/idle) and polling address of every base-transmitted packet on the selected channel (step 1001). If the channel status indication is idle (step 1002), flow proceeds to step 1003 to determine whether the mobile station has a packet to transmit. If not, flow returns to seep 1001. If there is one, flow proceeds to step 1004 to check to see if that packet is followed by a subsequent packet. If so, flow proceeds to step 1005 to send a packet containing a packet-to-follow indication; otherwise flow proceeds to step 1006 to send a packet with no packet-to-follow indication.

If the channel status indication is busy, flow proceeds from step 1002 to step 1007 to determine whether the polling address field is all zero bits. If this is the case, the mobile station recognizes that a data collision has occurred and the system operation has just been switched from random to polling mode and flow proceeds to step 1009 to determine whether there is a packet sent on the previous time slot. If so, it is determined that the previously transmitted packet was corrupted by the collision and flow proceeds to step 1010 to store a copy of the previous packet for retransmission when the mobile station is subsequently polled.

If the decision at step 1007 is negative, flow proceeds to step 1008 where the mobile station determines whether the polling address of the received packet matches the mobile's telephone number. If not, flow returns to step 1001. If the answer is affirmative at step 1008, it is determined that the mobile station is polled from the base station and flow proceeds to step 1003. This condition occurs not only in the polling mode but also in the random mode when the mobile station has successfully transmitted a packet in the previous time slot. In the latter case, the mobile station is entitled to send a packet in the next rime slot. As mentioned above, the base-transmitted packet received in the random mode is treated by the mobile station as a partial echo of its own previously transmitted packet.

Figure 11:
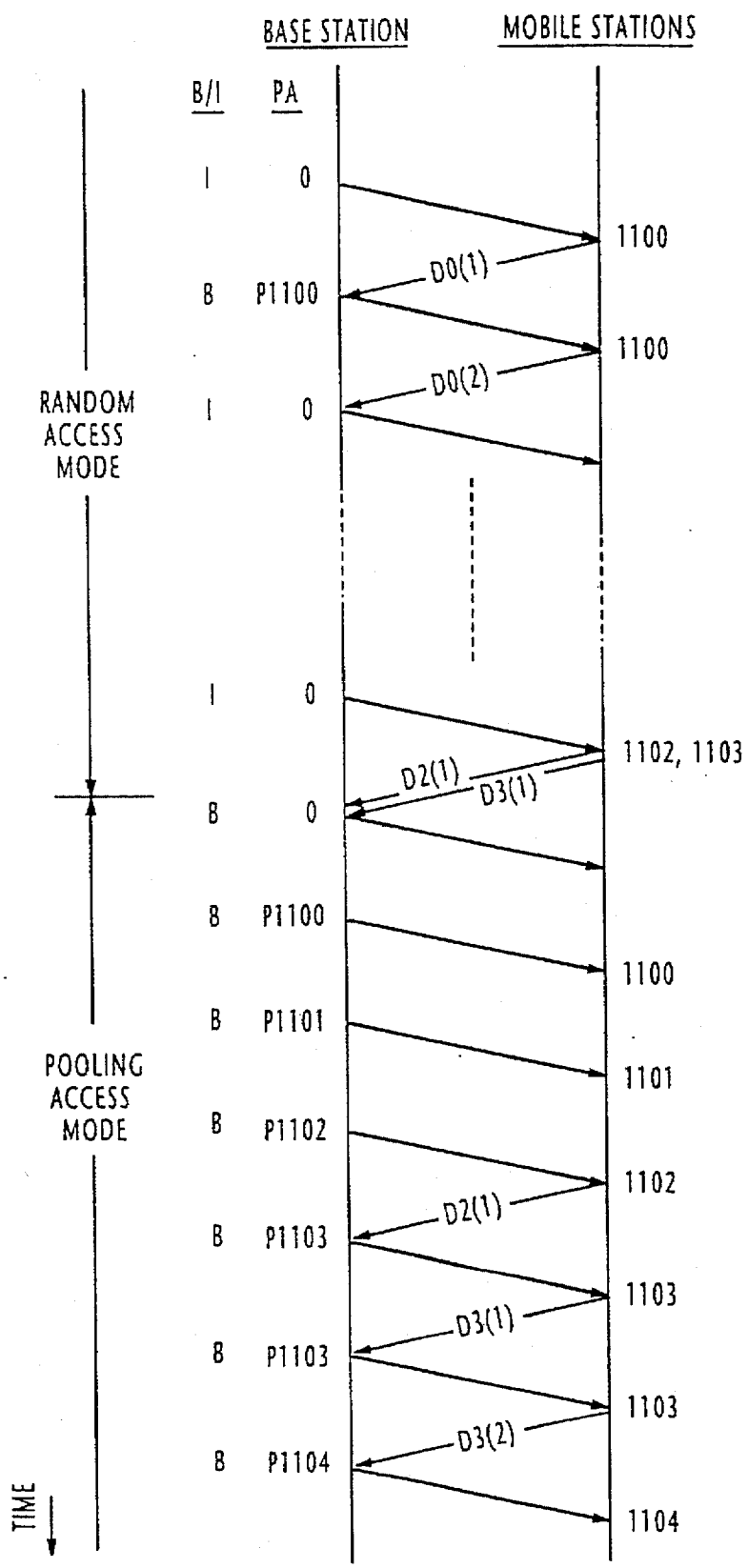
FIG. 11 is a timing chart illustrating a sequence of base- and mobile-transmitted packets associated with the embodiment of FIGS. 9 and 10.

The operation of the system of FIGS. 9 and 10 will be fully understood by the following description with the aid of FIG. 11. Initially, the operation seats with a random access mode. The data error rare determined at step 204 in the base-station transceiver will increase with time and becomes higher than the upper threshold R2 as the number of random transmissions exceeds some value.

FIG. 11 shows that, during the initial partial echo random access mode, mobile station 1100 transmits two packets D0(1) and D0(2). The first packet D0(1) is sent in response to a base-transmitted packer that contains busy/idle field (B/I)=idle (I) and polling address field (PA)=all zero's (0) since the "to-follow" field of the first packet is set. On receipt of packet D0(1), the base-station transceiver copies the identifier P1100 (telephone number) of the mobile station 1100 and sets the channel status m busy and returns a packet containing B/I=B and PA=P1100. In response, mobile station 1100 transmits the second packet D0(2). Since the second packet is not followed by a subsequent packet, the base transceiver resets the channel status to idle and returns a packet containing B/I=I and PA=0.

When a contention occurs between packets D2(1) and D3(1) sent respectively from mobile stations 1102 and 1103, for example, the error race of a received stronger signal at the base station exceeds the decision threshold and the base station switches to the polling access mode by setting a busy indication in the B/I field of a packet and all zero's in the polling address field and transmitting this packet as a mode switching command signal.

In the time slots that follow, the base station sends polling signals in succession each containing a busy indication and the mobile's identifier as a polling address. FIG. 11 shows that no transmit packet exists in polled mobile stations 1100 and 1101. When mobile station 1102 is polled, it retransmits the packet D2(1). Since this packet is not followed, the base station advances its polling sequence to P1103. Mobile station 1103 is then polled, and the packet D3(1) is retransmitted. If this packet contains a packet-to-follow indication, the base-station transceiver holds its polling sequence and returns a packet containing B/I=B and PA=P1103. In response, mobile station 1103 transmits a second packet D3(2). During this polling mode, the number of transmissions from mobile stations is controlled and the error rate will fall below the decision threshold to switch back to the random access mode (step 915).

What is claimed is:

1. A method for accessing a common channel from a plurality of terminals, comprising the steps of:
    a) allowing packet signal transmission by any of said terminals through said common channel to a base station on a random access mode as long as received packets at the base station have low error rate;
    b) sequentially polling the terminals to transmit packet signals on a controlled access mode so long as received packet signals at the base station have high error rate; and
    c) at each of steps (a) and (b), when a packet containing a packet-to-follow indication is received at the base station, reserving the next time slot for one of the terminals which transmitted the packet containing the packet-to-follow indication.

2. A method as claimed in claim 1, further comprising the step of transmitting from the base station to the terminal an instruction to select a different common channel when the error rate of a packet received at the base station exceeds a critical value.

3. A method for accessing a common channel from a plurality of terminals, comprising the steps of:
    a) transmitting a forward packet from a base station through said common channel to said terminals;
    b) receiving said forward packet at said terminals;
    c) transmitting a reverse packet from any of said terminals to the base station through said common channel if the received forward packet contains an idle indication, or from one of said terminals which previously transmitted a packet if the received forward packet contains a busy indication, or from a specified one of said terminals if the received forward packet contains a polling address;
    d) if no packet is received at the base station, repeating the step (a) to transmit a forward packet which contains said idle indication;
    e) if said reverse packet is received at the base station, determining whether the received packet has a high or low error rate;
    f) if the received reverse packet is determined as having a low error rate, repeating the step (a) to transmit a packet which contains said idle indication if the received reverse packet contains an indication that there is no packet to follow, or transmit a packet which contains said busy indication if the received reverse packet has an indication that there is a packet to follow; and
    g) if the received reverse packet is determined as having a high error rate, sequentially repeating the step (a) to transmit packets which contain polling addresses successively identifying said terminals.

4. A method for accessing a common channel from a plurality of terminals, comprising the steps of:
    a) transmitting a forward packet from a base station through said common channel to said terminals;
    b) receiving said forward packet at said terminals;
    c) if the received forward packet contains an idle indication, transmitting a reverse packet from any of said terminals to the base station through said common channel, and if the received forward packet contains a polling address, transmitting a reverse packet from a specified one of said terminals;
    d) if no packet is received at the base station, repeating the step (a) to transmit a forward packet which contains said idle indication;
    e) if said reverse packet is received at the base station, determining whether the received packet has a high or low error rate;
    f) if the received reverse packet is determined as having a low error rate, repeating the step (a) to transmit a packet which contains said idle indication if the received reverse packet contains an indication that there is no packet to follow, or transmit a packet which contains a polling address identifying one of the terminals which transmitted a previous reverse packet containing an indication that there is a packet to follow; and
    g) if the received reverse packet is determined as having a high error rate, sequentially repeating the step (a) to transmit packets which contain polling addresses successively identifying said terminals.

5. A method for accessing a common channel from a plurality of terminals, comprising the steps of:
    a) transmitting a forward packet from a base station through said common channel to said terminals;
    b) receiving said forward packet at said terminals;
    c) if the received forward packet contains an idle indication, transmitting a reverse packet from any of said terminals to the base station through said common channel, and if the received forward packet contains a busy indication and a polling address, transmitting a reverse packet from one of said terminals identified by the polling address, and if the received forward packet contains said busy indication and a zero polling address, storing copies of previous packets which were simultaneously transmitted from ones of said terminals for later retransmission when said ones of the terminals are successively identified by polling addresses;

d) if no packet is received at the base station, repeating the step (a) to transmit a forward packet which contains said idle indication;

e) if said reverse packet is received at the base station, determining whether the received packet has a high or low error rate;

f) if the received reverse packet is determined as having a low error rate, repeating the step (a) to transmit a packet which contains said idle indication if the received reverse packet contains an indication that there is no packet to follow, or transmit a packet which contains said busy indication and a polling address identifying one of the terminals which transmitted a previous reverse packer containing an indication that there is a packet to follow; and g) if the received reverse packet is determined as having a high error rate, repeating the step (a) to transmit a packet containing said busy indication and said zero polling address and then sequentially repeating the step (a) to transmit packets containing polling addresses successively identifying said terminals.

6. A method as claimed in claim 3, further comprising the steps of:

transmitting a channel selection command signal from the base station to said terminals when the error rate of the received reverse packet exceeds a critical value; and receiving the channel selection command signals at said terminals and selecting a new common channel.

7. A method as claimed in claim 4, further comprising the steps of:

transmitting a channel selection command signal from the base station to said terminals when the error rate of the received reverse packet exceeds a critical value; and receiving the channel selection command signal at said terminals and selecting a new common channel.

8. A method as claimed in claim 5, further comprising the steps of:

transmitting a channel selection command signal from the base station to said terminals when the error rate of the received reverse packet exceeds a critical value; and receiving the channel selection command signal at said terminals and selecting a new common channel.

9. A method for accessing a common channel from a plurality of terminals, comprising:

defining a base-transmitted packet to be used by a base station in all modes of operation, said packet including at least a busy/idle field;

defining a terminal-transmitted packet to be used by the plurality of terminals in all modes of operation, said terminal-transmitted packet including at least a packet-to-follow field;

transmitting from the base station a base-transmitted packet having the busy/idle field set to idle so long as the number of terminal transmitted packet collisions is below a predetermined threshold;

transmitting from the base station a base-transmitted packet having the busy/idle field set to busy when the number of terminal transmitted packet collisions reaches the predetermined threshold and when a received terminal-transmitted packet from a specific terminal has its packet-to-follow flag set to indicate that another packet would follow.

10. The method for accessing a common channel from a plurality of terminals of claim 9, wherein said base-transmitted packet further includes a polling field and when the number of terminal transmitted packet collisions reaches the predetermined threshold, said polling field is sequentially set to poll the terminals, and wherein when a received terminal-transmitted packet from a specific terminal has its packet-to-follow flag set to indicate that another packet would follow, said polling filed is set to poll said specific terminal.

11. The method for accessing a common channel from a plurality of terminals of claim 9, wherein said base-transmitted packet further includes a polling field and wherein when the number of terminal transmitted packet collisions is below the predetermined threshold and a received terminal-transmitted packet from a specific terminal has its packet-to-follow flag set to indicate that another packet would follow, said polling filed is set to zero.

12. The method for accessing a common channel from a plurality of terminals of claim 10, wherein said base-transmitted packet further includes a polling field and wherein when the number of terminal transmitted packet collisions is below the predetermined threshold and a received terminal-transmitted packet from a specific terminal has its packet-to-follow flag set to indicate that another packet would follow, said polling filed is set to zero.

13. The method of claim 9, wherein said base station sends a select new channel signal to the terminals when the number of terminal transmitted packet collisions exceeds a critical value.

14. The method of claim 10, wherein said base station sends a select new channel signal to the terminals when the number of terminal transmitted packet collisions exceeds a critical value.

15. The method of claim 11, wherein said base station sends a select new channel signal to the terminals when the number of terminal transmitted packet collisions exceeds a critical value.

16. The method of claim 12, wherein said base station sends a select new channel signal to the terminals when the number of terminal transmitted packet collisions exceeds a critical value.

17. The method of claim 9, wherein said base station signals to the terminals to store and retransmit an immediately preceding terminal-transmitted packet when the number of terminal transmitted packet collisions exceeds a critical value.

18. The method of claim 10, wherein said base station signals to the terminals to store and retransmit an immediately preceding terminal-transmitted packet when the number of terminal transmitted packet collisions exceeds a critical value.

19. The method of claim 11, wherein said base station signals to the terminals to store and retransmit an immediately preceding terminal-transmitted packet when the number of terminal transmitted packet collisions exceeds a critical value.

20. The method of claim 12, wherein said base station signals to the terminals to store and retransmit an immediately preceding terminal-transmitted packet when the number of terminal transmitted packet collisions exceeds a critical value.

21. The method of claim 17, wherein the base station signals to the terminals to store and retransmit an immediately preceding terminal-transmitted packet by transmitting a base-transmitted packet having the idle/busy field set to busy and a polling field set to zero.

22. The method of claim 18, wherein the base station signals to the terminals to store and retransmit an immediately preceding terminal-transmitted packet by transmitting a base-transmitted packet having the idle/busy field set to busy and the polling field set to zero.

23. The method of claim 19, wherein the base station signals to the terminals to store and retransmit an immediately preceding terminal-transmitted packet by transmitting a base-transmitted packet having the idle/busy field set to busy and the polling field set to zero.

24. The method of claim 20, wherein the base station signals to the terminals to store and retransmit an immediately preceding terminal-transmitted packet by transmitting a base-transmitted packet having the idle/busy field set to busy and the polling field set to zero.

* * * * *